United States Patent
Kozyuk

(10) Patent No.: US 9,682,355 B2
(45) Date of Patent: Jun. 20, 2017

(54) METHOD FOR CONDUCTING SONOCHEMICAL REACTIONS AND PROCESSES

(71) Applicant: Arisdyne Systems, Inc., Cleveland, OH (US)

(72) Inventor: Oleg Kozyuk, North Ridgeville, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 216 days.

(21) Appl. No.: 14/729,624

(22) Filed: Jun. 3, 2015

(65) Prior Publication Data

US 2015/0367313 A1  Dec. 24, 2015

Related U.S. Application Data

(60) Provisional application No. 62/013,785, filed on Jun. 18, 2014.

(51) Int. Cl.

| | |
|---|---|
| *B01J 19/00* | (2006.01) |
| *B01F 5/02* | (2006.01) |
| *B01F 5/06* | (2006.01) |
| *B01J 8/20* | (2006.01) |
| *B01J 19/24* | (2006.01) |

(52) U.S. Cl.
CPC ........... *B01J 19/008* (2013.01); *B01F 5/0268* (2013.01); *B01F 5/0688* (2013.01); *B01F 5/0689* (2013.01); *B01J 8/20* (2013.01); *B01J 19/006* (2013.01); *B01J 19/2415* (2013.01); *B01J 2219/00768* (2013.01)

(58) Field of Classification Search
CPC ...... B01J 19/008; B01F 5/0688; B01F 5/0689
USPC ............................................... 366/162.4, 337
See application file for complete search history.

(56) References Cited

U.S. PATENT DOCUMENTS

| | | | |
|---|---|---|---|
| 5,937,906 A | 8/1999 | Kozyuk | |
| 7,247,244 B2 * | 7/2007 | Kozyuk | .................... C02F 1/72 210/748.13 |
| 7,708,453 B2 * | 5/2010 | Kozyuk | ................ B01F 3/0807 138/42 |
| 2006/0187748 A1 * | 8/2006 | Kozyuk | ................ B01F 3/0807 366/162.4 |
| 2007/0138912 A1 * | 6/2007 | Satterwhite | ............ B01J 19/008 310/328 |
| 2010/0015892 A1 * | 1/2010 | Vijay | ...................... B05B 1/083 451/36 |

OTHER PUBLICATIONS

Moholkar, et al., Hydrodynamic cavitation for sonochemical effects; Ultrasonics Sonochemistry, 1999, vol. 6, pp. 53-65.

(Continued)

*Primary Examiner* — David Sorkin
(74) *Attorney, Agent, or Firm* — Pearne & Gordon LLP

(57) ABSTRACT

Described herein are method for conducting sonochemical reactions and processes in a liquid. The liquid is passed through a device that generates a liquid jet containing cavitation bubbles and collides the liquid jet with an impact body or other liquid jet to force the collapse of the cavitation bubbles at a select compressive stagnation pressure. The compressive stagnation pressure of the liquid is between 50 and 99 percent of the static pressure of the liquid upon entry of a constriction that generates the liquid jet containing cavitation bubbles.

20 Claims, 1 Drawing Sheet

(56) References Cited

OTHER PUBLICATIONS

Ashokkumar et al., A New Look at Cavitation and the Applications of Its Liquid-Phase Effects in the Processing of Food and Fuel, Applied Physics Research, 2012, vol. 4, No. 1, pp. 19-29.
Goncalves et al., Sonochemical and Hydrodynamic cavitation reactors for laccase/hydrogen peroxide cotton bleaching, Ultrasonics Sonochemistry, 2014, vol. 21, pp. 774-781.
Kalumuck, et al., The Use of Cavitating Jets to Oxidize Organic Compounds in Water, Journal of Fluids Engineering; Sep. 2000, vol. 122, pp. 465-470.
The International Search Report and Written Opinion issued in International Patent Application No. PCT/US2015/033980; Mailing Date: Aug. 27, 2015.

\* cited by examiner

METHOD FOR CONDUCTING SONOCHEMICAL REACTIONS AND PROCESSES

This application claims the benefit of U.S. provisional application Ser. No. 62/013,785 filed Jun. 18, 2014, the contents of which are incorporated herein in their entirety by reference.

FIELD

The invention relates to methods for conducting sonochemical reactions and processes in aqueous and non-aqueous liquids, and more particularly, to methods that utilize hydrodynamic cavitation effects for conducting the sonochemical reactions and processes. The method and processes of the present invention are effective and useful in the fields of chemistry, electronic materials, petroleum chemistry, biochemistry, water treatment, food, agriculture, medication, and the pharmaceutical industry.

BACKGROUND

Sonochemistry involves the application of ultrasound energy to carry out chemical reactions and processes. The mechanism causing sonochemical effects in liquids is the phenomenon of ultrasonic cavitation. There are many chemical reactions that are influenced by ultrasonic cavitation and that influence can alter the speed and yield of finished products.

There also exists a great quantity of chemical reactions that beneficially proceed under the influence of ultrasonic cavitation. Similar reactions may be accomplished in aqueous, as well as non-aqueous, liquids. Chemical action can occur in the cavitation bubble collapse when there is significant compression heating of the vapor and gas. (Timothy J. Mason, "Advances in Sonochemistry", Volume 3. 1993. 292 pp., JAI Press Inc.). As the cavitation bubble accelerates through the collapse, no heat is lost through the bubble interface in the final collapsed stage. Though no heat is lost with respect to the amount stored (adiabatic process), there is vigorous heat flux for a brief instant and a thin thermal boundary layer forms near the bubble interface. Experimental results have shown that these bubbles have temperatures around 5000 K, pressures of roughly 1000 atm, and heating and cooling rates above $10^{10}$ K/s (K. S. Suslick, Science, Vol. 247, 23 Mar. 1990, pgs. 1439-1445). These high temperatures and pressures can create extreme physical and chemical conditions in otherwise cold liquids.

The following sonochemical effects can be observed in chemical reactions and processes: increase in reaction output and speed, changing of reaction pathway and increase in the reactivity of reagents or catalysts, improvement of phase transfer and activation catalysts, avoidance of catalysts and breakage molecular bonds, improvement of particle and droplets formations and synthesis.

Common for sonochemical reactions and processes is that, for the creation of cavitation bubbles in a liquid, application of ultrasonic oscillations on the liquid is used. The basic equipment which is used in sonochemistry appears as ultrasonic devices of various designs.

This method of conducting sonochemical reactions is sufficiently effective for processing small volumes of liquids and has found its chief application on the level of laboratory research. Transitioning to large scale volumes, however, which are used in industry, is significantly difficult and even at times impossible. This is associated with the problems which arise during the scaling up of cavitation that is produced with the aid of ultrasonic oscillations.

It is possible to avoid these shortcomings, however, by producing the quality of the initiator of sonochemical reactions, cavitation bubbles, through the course of hydrodynamics. An example of using hydrodynamic cavitation for conducting sonochemical reactions is presented in the work of: Pandit A. B., Moholkar V. S., "Harness Cavitation to Improve Processing," Chemical Engineering Progress, July 1996, pgs. 57-69.

Methods disclosed in U.S. Pat. Nos. 5,937,906; 6,012,492 and 6,035,897, for conducting sonochemical reactions and processes using in large scales liquid medium volumes, involve passing a hydrodynamic liquid flow at a velocity through a flow through channel internally containing at least one element to produce a local constriction of the hydrodynamic liquid flow. The velocity of the liquid flow in the local constriction is at least 16 msec. A hydrodynamic cavitation cavern is created downstream of the local constriction, thereby generating cavitation bubbles. The cavitation bubbles are shifted with the liquid flow to an outlet from the flow through channel and the static pressure of the liquid flow is increased to at least 12 psi. The cavitation bubbles are then collapsed in the elevated static pressure zone, thereby initiating the sonochemical reactions and processes.

The existing methods are not sufficient to generate significant compression energy release during bubble collapse.

The compression of the bubbles during cavitation in the discourse patents occurs under static pressure $P_1$ increased in the liquid flow. Increasing static pressure of the liquid flow is a linear process and pressure cannot be higher than $P_1 > 0.3$ P (to avoiding cavitation suppression), where P is the static pressure before local constriction which passes a hydrodynamic liquid flow through a flow-through local constriction, and $P_1$ is the static pressure behind local constriction. In most cases cavitation bubbles collapse when static pressure surrounding the bubble is $P_1 = (0.05-0.1)$ P.

The power output, N, from the cavitation bubble collapse is $$N = 4.60 R^2 \sqrt{\frac{P_1^2}{\rho}},$$

where R—maximum radius the bubble has at the beginning of collapse, $P_1$—is hydrostatic external pressure surrounding the bubble, ρ—liquid density.

There are different approaches to account for the shockwave produced from a cavity collapse to, but an approximate relationship for the pressure peak amplitude, $p_p$, given by Brennan is $p_p = 100 \, RP_1/r$, where R—is the maximum bubble radius, r—is the distance from the bubble, and $P_{1-}$ is hydrostatic external pressure surrounding the bubble. (C. E. Brennan. Cavitation and Bubble Dynamics. Oxford University: New York, 1995.)

Thus, utilization of static pressure $P_1$ in the liquid flow for compression of the bubbles is not an effective method and leads to a low intensity of sonochemical reactions and decrease the degree of heating the medium. Accordingly, there is a continuing need for alternative methods for realizing sonochemical reactions which can provide more effective utilization energy of the hydrodynamic flow. The present invention contemplates a new and improved method for conducting sonochemical reactions and processes and allows the utilization of more effective hydrodynamic cavitation regimes.

SUMMARY

Described herein are methods for conducting sonochemical reactions and processes in a liquid. In one embodiment, a method for conducting sonochemical reactions and processes can include passing a liquid at static pressure (P) through a constriction of a device to form a liquid jet having cavitation bubbles contained therein, wherein the cavitation bubbles are formed as the liquid passes through the constriction. The cavitation bubbles in the liquid jet are then subjected to a compressive stagnation pressure, $P_{st}$, wherein $P_{st}$ is in the range of $P_{st}=(0.5-0.99)*P$, by colliding the cavitation bubbles with a target within less than 1 millisecond or less than 0.5 millisecond of the liquid exiting the constriction.

The constriction can be at least one orifice, nozzle or aperture suitable for forming cavitation bubbles in a liquid. The constriction can be arranged in the device such that the constriction is perpendicular to the inlet flow of the liquid into the device. In another embodiment, the constriction can be arranged in the device such that the constriction is parallel to the inlet flow of the liquid into the device.

The method for conducting sonochemical reactions and processes in a liquid can be carried out by passing the liquid through the device in one or multiple passes, such as two or more passes through the device. The liquid can be passed through the device at an inlet static pressure (P) of at least 250 or 500 psi.

In one embodiment, the compressive stagnation pressure, $P_{st}$, resulting from colliding the cavitation bubbles with a target within less than 1 millisecond of the liquid exiting the constriction can be defined as being greater than 0.55*P and less than 0.85*P.

In another embodiment, the target can be an impact body. The impact body can be positioned in the device downstream of the constriction such that the impact body is between 4 to 200 mm from the outlet of the constriction. The impact body can have an impact surface for the colliding cavitation bubbles, for example, the impact surface can be perpendicular to the inlet flow of the liquid into the device or the liquid jet exiting the constriction.

The target can also be a second liquid jet. The second liquid jet can contain cavitation bubbles. For example, the cavitation bubbles in the second liquid jet in the device can be formed by passing a liquid or a portion of the liquid entering the device through a second constriction. The second constriction can be perpendicular to the inlet flow of the liquid into the device.

The liquid being passed through the device can be an aqueous liquid, organic liquid or a mixture thereof. In one embodiment, the liquid entering the device can contain at least one gas or gaseous component, such as a dissolved or entrained gas in the liquid.

DETAILED DESCRIPTION

Figure 1:
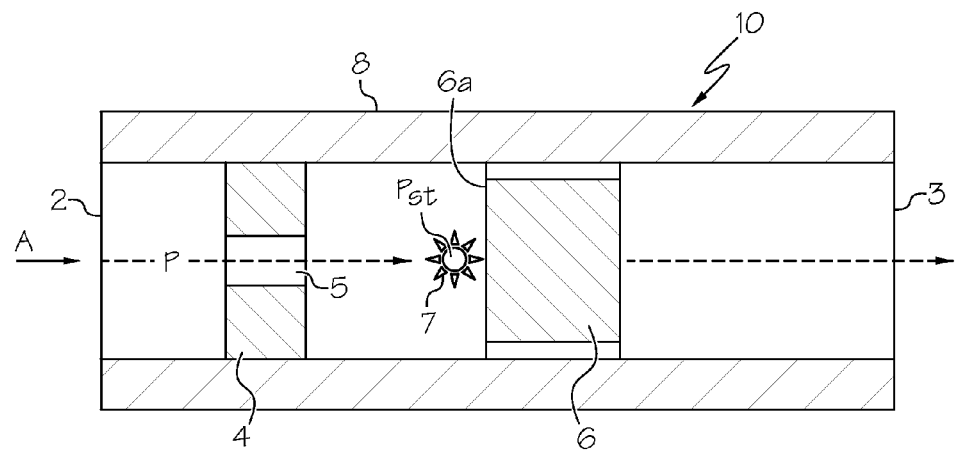
FIG. 1 illustrates one embodiment of a cavitation device 10 that can be used for conducting sonochemical reactions and processes. A longitudinal cross-sectional view of the device 10 is shown.

Herein, when a range such as 5-25 (or 5 to 25) is given, this means preferably at least or more than 5 and, separately and independently, preferably not more than or less than 25. In an example, such a range defines independently not less than 5, and separately and independently, not more than 25.

A method has been discovered for an efficient for conducting sonochemical reactions and processes by subjecting cavitation bubbles to a compressive stagnation pressure upon colliding with a target. It has been found that selective use of a target in a cavitation device can improve the sonochemical efficiency when cavitation bubbles in a liquid stream are collided with the target less than 1 millisecond upon formation from a constriction to impart a compressive stagnation pressure of 50 to 99 percent of the static pressure of the liquid entering the constriction. The cavitation bubbles are collapsed upon colliding with the target and abrupt and forceful energy release beneficially increases the efficiency of sonochemical reactions and processes in an unexpected manner.

Referring now to the drawings wherein the showings are for purposes of illustrating various embodiments of the present invention only and not for purposes of limiting the same.

FIG. 1 shows a device 10 for conducting sonochemical reactions and processes in a liquid. The device 10 includes a liquid inlet 2 with arrow A indicating the direction of liquid flow into the inlet 2. At the opposite end of the device, a liquid outlet 3 is shown with an arrow indicating the direction of liquid flow out of the outlet 3. The liquid flow path through the device 10, e.g., through the inlet 2 and outlet 3, is defined by a channel 8, which can be a tube or pipe having a circular cross-section.

The liquid can be passed through the device 10 with fluid pumping devices as known in the art, such as a pump, centrifugal pump, positive-displacement pump or diaphragm pump. An auxiliary pump can provide liquid flow under pressure to the device, i.e. processing pressure. The processing pressure is preferably at least 200, 400, 600, 800, 1000, 2000 or 3000 psi.

The device 10 can include a constriction or flow constriction. The constriction can be an orifice, baffle, bluff body or nozzle. Preferably, the constriction is fixed in the device such that is static during the formation of a liquid jet containing cavitation bubbles. The orifice can be any shape, for example, cylindrical, conical, oval, right-angled, square, etc. Depending on the shape of the orifice, this determines the shape of the liquid jets containing cavitation bubbles flowing from the flow constriction. In certain embodiments, the orifice can be configured in the shape of a Venturi tube, aperture, nozzle, orifice of any desired shape, or slot. The orifice can have any diameter, for example, the diameter can be greater than 0.1, 0.3, 0.5, 0.7, 1, 2, 3, 5, 10 mm or more, and preferably more than 0.3 mm. In one example, the diameter of the orifice can be less than 2, 1 or 0.5 mm.

The liquid enters the constriction at a static pressure, P. The static pressure, P, can be at least 200, 300, 400, 500, 600, 700, 800, 900, 1000, 2000, 3000, 4000, 5000, 10000, 20000, 30000 psi and higher. As the liquid passes through the constriction, a liquid jet is formed having cavitation bubbles formed therein. The liquid jet exiting the constriction has an increased velocity, for example, the liquid jet can have a velocity of 30, 40, 50, 60, 70, 80, 90, 100, 200, 300, 400, 500 meters/second and higher.

As shown, the device 10 includes a circular orifice opening 5 formed by plate 4 for generating and forming a liquid jet containing cavitation bubbles as the liquid entering the device travels through the orifice. It will be appreciated that the plate 4 can be embodied as a disk when the constriction 5 has a circular cross-section, or the plate 4 can be embodied in a variety of shapes and configurations that can match the cross-section of the constriction 5. The liquid jet exits the constriction 5 can travels through the device and collides with a target, for example, an impact target 6. An impact target 6 can be a solid body arranged in the device 10 in the flow path, either the entire or partial flow path, of the liquid jet. The impact target 6 can contain an impact surface, e.g., 6a, for contacting the cavitation bubbles colliding with the target. Preferably, the impact surface 6a has a larger surface area than the cross-sectional area of the constriction 5 opening as shown in FIG. 1.

The impact target 6 is positioned downstream from the constriction 5 in the device 10. Preferably, there are no objects positioned in the channel 8 or other constrictions arranged between the constriction 5 exit and the impact surface 6a. The impact surface 6a can be positioned in the channel 8 of the device 10 such that the surface is perpendicular to the direction of the liquid flowing into the device 10 upstream of the constriction 5. Alternatively, the impact surface can be positioned parallel or at an angle (e.g., 30, 45, 60°) to the direction of the liquid flowing into the device 10 upstream of the constriction 5. The impact surface or impact body can be spaced away from and downstream of the constriction exit at a distance in the range of 4 to 200 mm, 10 to 150 mm, 25 to 100 mm or 40 to 80 mm.

In one embodiment, the impact surface 6a is positioned away from and downstream of the constriction exit such that the liquid jet containing cavitation bubbles exiting and being formed by passage through the constriction takes less than 1 millisecond to reach and collide with the impact surface. Alternatively, the liquid jet containing cavitation bubbles takes less than 0.8, 0.7, 0.6, 0.5 or 0.4 millisecond to reach the impact surface after exiting the constriction as described above.

In operation, a hydrodynamic liquid stream or processing liquid moves along the direction, indicated by arrow A, through the inlet 2 and flows into flow-through channel 8. As the liquid stream approaches the constriction 5, static pressure P applied by a pump to the liquid forces it through the constriction 5 in a liquid jet through the constriction 5. A liquid jet containing exits the constriction with cavitation bubbles being formed therein and travels downstream with no obstructions before impacting target 6 within 1 milliseconds or less of exiting the constriction 5. Upon collision with the target (e.g., impact surface 6a), a compressive stagnation pressure $P_{st}=(0.5-0.99) \times P$ develops at the jet impact compression point 7 at or near the impact surface 6a that forces the collapse of one or more of the cavitation bubbles in the liquid jet.

The power output, N, of the forced collapse of a cavitation bubble, for example in the liquid jet, can be measured as $$N = 4.60 R^2 \sqrt{\frac{P_{st}^3}{\rho}},$$

where R is the initial radius of the bubble at the beginning of collapse, $P_{st}$ is the compressive stagnation pressure surrounding the bubble, $\rho$ is the density of the liquid surrounding the bubble. Shockwave pressure peak amplitude of the collapse of the cavitation bubble can be measured as $p_p=100 R^* P_{st}/r$, wherein r is the distance from the center of the bubble to the surface of the impact body.

In one embodiment, the cavitation bubbles moving into the impact compression zone or point 7 within 1 millisecond or less of the liquid jet exiting the constriction 5 can maintain bubble size (initial radius R) as the bubbles travel from the constriction exit to the impact surface before collapse. In general, cavitation bubbles traveling downstream of a constriction will reduce in size and collapse under downstream pressure. In the present disclosure, the short time period between cavitation bubble formation and collapse thereof by impact with the target allows for the utilization of more effective hydrodynamic cavitation regimes for conducting sonochemical reactions and processes without the cavitation bubble significantly reducing in size and collapsing under downstream pressure. The increased bubble radius upon collapse in the present disclosure provides a higher power output upon collapse as compared to a cavitation bubble collapsing under downstream pressure without impacting a target.

The methods described herein make it possible to process liquids with increased viscosity, such as viscous liquids and heavy oils. Collapsing a cavitation bubble in water requires less collapsing pressure due, in part, to the high surface tension of water, low viscosity, and a high degree of gas solubility. In contrast, the collapse of a cavitation bubble in organic liquids and high molecular weight liquids such as, monomers, polymers, oligomers, petrochemicals, hydrocarbons and resins can be difficult because the liquids have high viscosities and low gas solubility. The proposed method of processing liquid media can be used to produce systems comprising polymers, oligomers, monomers, petrochemicals, hydrocarbons, resin or a combination of any of these, loaded or not loaded with a filler material. Filler material means filler particles, filler droplets, or fillers in any form, which can be organic or inorganic, conductive or non-conductive.

Figure 2:
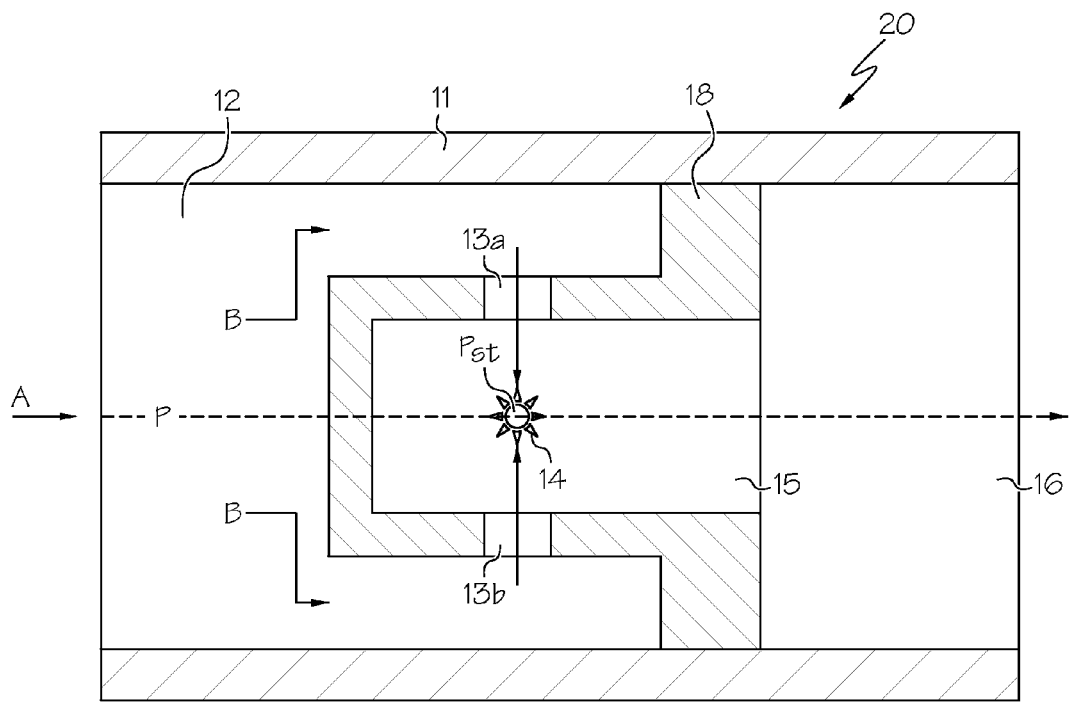
FIG. 2 illustrates one embodiment of a cavitation device 20 that can be used for conducting sonochemical reactions and processes. A longitudinal cross-sectional view of the device 20 is shown.

FIG. 2 shows another embodiment of a device suitable for carrying out the methods discussed herein. The device 20 includes a channel 11 defining an inlet 12 with arrow A indicating the direction of liquid flow into the inlet 12 and, at the opposite end of the device, an outlet 16 is shown with an arrow indicating the direction of liquid flow out of the outlet 16. The channel 11 can be a flow-through channel, which can be a tube or pipe having a circular cross-section openings. The liquid entering the device 20 can be supplied as discussed for device 10 of FIG. 1, for example, by a pump at a desired liquid static pressure, P.

The liquid entering the device 20 through inlet 12 is split into two streams indicated by arrows B as it flows around an upstream portion of body 18. Body 18 is arranged in channel 11 and can contain at least one constriction. The constriction can be an orifice, baffle, bluff body or nozzle. Preferably, the constriction is fixed in the device such that it is static during the formation of a liquid jet containing cavitation bubbles. The orifice can be any shape, for example, cylindrical, conical, oval, right-angled, square, etc. Depending on the shape of the orifice, this determines the shape of the liquid jets containing cavitation bubbles flowing from the flow constriction. In certain embodiments, the orifice can be configured in the shape of a Venturi tube, aperture, nozzle, orifice of any desired shape, or slot. The orifice can have any diameter, for example, the diameter can be greater than 0.1, 0.3, 0.5, 0.7, 1, 2, 3, 5, or 10 mm, and preferably more than 3 mm. In one example, the diameter of the orifice can be less than 2, 1 or 0.5 mm.

As shown, body 18 contains two constrictions, e.g., a first constriction 13a and a second constriction 13b. The constrictions 13a, 13b shown in FIG. 2 are arranged such that the liquid flows through the constrictions into passageway 15 in a direction perpendicular to the direction of liquid flow entering the device 20 through inlet 12. To guide the liquid flow, the constrictions 13a, 13b are also arranged perpendicular to the direction of liquid flow entering the device 20 through inlet 12. For instance, the openings in the constrictions face the inner wall of the of the flow channel 11. The passageway 15 of body 18 is open to the downstream outlet 16 of the device 20 such that the liquid flowing through the constrictions 13a, 13b can exit the device.

A portion of the liquid entering the device 20 flows into constriction 13a at a static pressure, P, which can be as discussed above for constriction 5. As the liquid flows through and exits the first constriction 13a, a liquid jet containing cavitation bubbles is formed. The liquid jet containing cavitation bubbles exits the first constriction 13a and travels into the passageway 15 of body 18. In a similar manner, a portion of the liquid entering the device 20 flows into constriction 13b at a static pressure, P, wherein the static pressure at constriction 13b can be the same as the static pressure at constriction 13a. As the liquid flows through and exits the second constriction 13b, a liquid jet containing cavitation bubbles is formed. As arranged in the device 20, the first and second constrictions oppose one another and their respective openings are in alignment or in register (e.g., vertically as shown) with one another. During operation, the liquid jet containing cavitation bubbles (i.e. first liquid jet) exiting the first constriction 13a collides with the liquid jet containing cavitation bubble (i.e. second liquid jet) exiting the second constriction 13b at impact compression point 14 at compressive stagnation pressure $P_{st}$. The second liquid jet, or alternatively the first liquid jet, acts as an impact target to facilitate the collapse of the cavitation bubbles contained in both streams. Upon collapse of the cavitation bubbles from the first and second liquid jets, the liquid exits the device 20 through outlet 16.

The first and second constrictions 13a, 13b are spaced apart from one another, for example, in the range of 4 to 200 mm, 10 to 150 mm, 25 to 100 mm or 40 to 80 mm. The constrictions 13a, 13b are positioned away from each other such that the liquid jets containing cavitation bubbles and being formed by passage through the constrictions take less than 1 millisecond to reach and collide with one another. Alternatively, either liquid jet containing cavitation bubbles can take less than 0.8, 0.7, 0.6, 0.5 or 0.4 millisecond to collide with the other liquid jet containing cavitation bubbles, e.g., the liquid jet exiting the opposite constriction.

For device 20, the compressive stagnation pressure upon collision between the two liquid jets can be $P_{st}=(0.5-0.99) \times P$ at the jet impact compression point 14 that forces the collapse of one or more of the cavitation bubbles in the liquid jets. The power output, N, of the collision and the shockwave pressure peak amplitude, $p_p$, can be measured for the collision of the two liquid jets as described above for liquid jet in device 10.

As used herein, the liquid utilized in the methods and devices described herein can be any suitable liquid. For example, the processing liquid can be an aqueous or non-aqueous liquid or organic liquid. The organic liquid can include low and high molecular weight liquids or components such as, monomers, polymers, oligomers, petrochemicals, hydrocarbons and resins. Also as used herein, petrochemicals and hydrocarbons are used interchangeably and refer to any petroleum or hydrocarbon mixture such as crude oil, used motor oil, vacuum gas oils, refining residuum, cat cracker bottoms, fuel oil, vacuum tower bottoms, atmospheric tower refining bottoms, residual fuel oils and mixtures thereof.

As used herein, polymers, oligomers, monomers, resin are used interchangeably and refer to any material include epoxies, maleimides (including bismaleimide), acrylates and methacrylates, and cyanate esters, vinyl ethers, thiol-enes, fumarates and maleates. Other exemplary compounds include polyamides, phenoxy compounds, benzoxazines, polybenzoxazines, polyether sulfones, polyimides, siliconized olefins, polyolefins, polyesters, polystyrenes, polycarbonates, polypropylenes, poly(vinyl chloride)s, polyisobutylenes, polyacrylonitriles, poly(vinyl acetate)s, poly (2-vinylpyridine)s, cis-1,4-polyisoprenes, 3,4-polychloroprenes, vinyl copolymers, poly(ethylene oxide)s, poly(ethylene glycol)s, polyformaldehydes, polyacetaldehydes, poly(b-propiolacetone)s, poly(10-decanoate)s, poly (ethylene terephthalate)s, polycaprolactams, poly (11-undecanoamide)s, poly(m-phenylene-terephthalamide)s, poly (tetramethlyene-m-benzenesulfonamide)s, polyester polyarylates, poly(phenylene oxide)s, poly(phenylene sulfide)s, poly(sulfone)s, polyetherketones, polyetherimides, fluorinated polyimides, polyimide siloxanes, poly-isoindolo-quinazolinediones, polythioetherimide poly-phenylquinoxalines, polyquinixalones, imide-aryl ether phenylquinoxaline copolymers, polyquinoxalines, polybenzimidazoles, polybenzoxazoles, polynorbornenes, poly(arylene ethers), polysilanes, parylenes, benzocyclobutenes, hydroxyl-(benzoxazole) copolymers, poly(silarylene siloxanes), bisphenol, naphthalene, phenol or cresol novolac, dicyclopentadiene, polybutadiene, polycarbonate, polyurethane, polyether, or polyester, poly(butadienes), poly (carbonates), poly(urethanes), poly(ethers), poly(esters), simple hydrocarbons, and simple hydrocarbons containing functionalities such as carbonyl, carboxyl, amide, carbamate, urea, ester, poly(butadienes), poly(carbonates), poly (urethanes), poly(ethers), poly(esters) or ether.

The liquid can be comprised of a mixture of two or more liquid components such as one liquid soluble in one of the components as well as mutually insoluble liquids, for example, in the form of emulsions. Furthermore, the processing liquid can include dense or non-liquid components, for example filler material particles, such as particles that exhibit the characteristics of a solid, semisolid or a high viscosity liquid, which can be present as a reactant, filler or performs the function of a catalyst. There may also be particles of several solid components present in the liquid flow. There may also be at least one gaseous component present in the liquid flow.

In order to promote a further understanding of the invention, the following examples are provided. These examples are shown by way of illustration and not limitation.

Example 1

A potassium iodide solution (KI solution) having a concentration of 1 weight percent in distilled water was prepared. Two single-orifice devices similar to that shown in FIG. 1 were used to process the KI solution. The first device contained a constriction orifice having an opening of 1.85 mm and the second device contained a constriction orifice having an opening of 0.35 mm. The KI solution was processed through each device for 20 minutes that included repeated circulation through the devices.

The iodine concentration was measured after processing to quantify the sonochemical efficiency. The concentration of $I_3-$ ion (based on Weissler reaction) was measured at an absorption wavelength of 355 nm by using a spectrophotometer. The Weissler reaction in which iodide is oxidized to a triiodide complex ($I_3^-$) has been widely used for measurement of the intensity of ultrasonic and hydrodynamic cavitation.

Table 1 below shows the operating conditions for each device during processing of the KI solution. P is the static pressure at the inlet of the constriction and $P_{st}$ is the compressive stagnation pressure calculated as described above and measured at the collision of the liquid jet with the impact body. T is the time between the liquid jet exiting the constriction orifice and the liquid jet colliding with the impact body positioned downstream of the constriction orifice.

TABLE 1

| Orifice size, mm | P, PSI | $P_{st}$, PSI | $P_{st}/P$ | T, millisecond | Iodine concentration, micromole/l |
|---|---|---|---|---|---|
| 1.85 | 500  | 79   | 0.16 | 2.76  | 1.6  |
| 1.85 | 1000 | 143  | 0.14 | 1.32  | 2.3  |
| 1.85 | 500  | 290  | 0.58 | 0.50  | 16.5 |
| 1.85 | 1000 | 540  | 0.54 | 0.26  | 19.3 |
| 0.35 | 4000 | 2880 | 0.72 | 0.024 | 54.1 |
| 0.35 | 8000 | 6400 | 0.80 | 0.018 | 81.6 |

Hydrodynamic cavitation had a maximum efficiency of about $1.65 \times 10^{-5} - 8.16 \times 10^{-5}$ moles of $I_3^-$ per liter when the compressive stagnation pressure was in range of $P_{st}=(0.5-0.99)*P$ as compared with the maximum of almost $2.3 \times 10^{-6}$ mol $l^{-1}$ for a compressive stagnation pressure of $P_{st}=0.14*P$.

The utilization of devices as shown herein and of certain compressive stagnation pressures in the liquid flow for compression and collapse of cavitation bubbles is an effective method and leads to a high intensity of sonochemical reactions and increases the degree of heating in the medium. Methods described herein can increase the rate of chemical reactions, cause reactions to occur under less restrictive conditions, reduce the number of steps required in a reaction, and enhance catalyst efficiency or initiate of reduction at carbon-carbon bonds.

Examples of sonochemical reactions that can be improved of using the methods described herein are preparation of high purity materials, narrow size distributions of nanoparticles and emulsions with uniform shapes, improvement of the performance of phase transfer catalysts and reactivity of catalysts or reagents, degassing of liquids and hydrolysis of non-hydratable phospholipids in oil, promoting conversion of dissolved calcium and bicarbonate ions into calcium carbonate and microbial cell disruption, treatment of liquid hydrocarbon such as crude oil, fuel oil, bitumen, and various bio-fuels, reduction in viscosity and increases in both yield and temperature of such hydrocarbons, and producing a filled resin electrically and thermally conductive materials.

In another example, the present disclosure relates to reactions and processes which are effective and useful in the fields of chemistry, electronic materials, biochemistry, agriculture, medication, and pharmaceutical industry.

It should now be apparent that there has been provided, in accordance with the present invention, a novel process for enhancing alcohol production by utilizing conventional starch by-products that satisfies the benefits and advantages set forth above. Moreover, it will be apparent to those skilled in the art that many modifications, variations, substitutions and equivalents for the features described above may be effected without departing from the spirit and scope of the invention. Accordingly, it is expressly intended that all such modifications, variations, substitutions and equivalents which fall within the spirit and scope of the invention as defined in the appended claims to be embraced thereby.

The preferred embodiments have been described, herein. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A method of conducting sonochemical reactions or processes in a liquid comprising the steps of:
   a. passing a liquid at static pressure P through a constriction of a device to form a liquid jet containing cavitation bubbles; and
   b. subjecting the cavitation bubbles in the liquid jet to a compressive stagnation pressure, $P_{st}$, wherein $P_{st}$ is $P_{st}=(0.5-0.99)P$, by colliding the cavitation bubbles with a target within less than 1 millisecond of the liquid exiting the constriction.

2. The method of claim 1, the cavitation bubbles colliding with the target within less than 0.5 millisecond of the liquid exiting the constriction.

3. The method of claim 1, the constriction being perpendicular to the inlet flow of the liquid into the device.

4. The method of claim 1, the constriction being parallel to the inlet flow of the liquid into the device.

5. The method of claim 1, the target being an impact body.

6. The method of claim 5, the impact body being positioned in the device downstream of the constriction such that the impact body is between 4 to 200 mm from the outlet of the constriction.

7. The method of claim 5, the impact body having an impact surface for the colliding cavitation bubbles, the impact surface being perpendicular to the inlet flow of the liquid into the device.

8. The method of claim 1, the target being a second liquid jet.

9. The method of claim 8, the second liquid jet containing cavitation bubbles.

10. The method of claim 9, the second liquid jet being formed by passing a portion of the liquid through a second constriction in the device.

11. The method of claim 9, the second constriction being perpendicular to the inlet flow of the liquid into the device.

12. The method of claim 1, the liquid being an aqueous liquid, organic liquid or a mixture thereof.

13. The method of claim 1, the liquid jet containing cavitation bubbles comprising at least one solid, semisolid, particulate or a mixture thereof.

14. The method of claim 1, the liquid comprising at least one gaseous component.

15. The method of claim 1, the constriction comprising at least one orifice, nozzle or aperture.

16. The method of claim 1, the method being carried out in one pass through the constriction of the device.

17. The method of claim 1, the method being carried out in two or more passes through the constriction of the device.

18. The method of claim 1, the static pressure P being greater than 250 psi.

19. The method of claim 1, the static pressure P being greater than 500 psi.

20. The method of claim 1, $P_{st}$ being greater than $0.55*P$ and less than $0.85*P$.

* * * * *